UNITED STATES PATENT OFFICE 2,312,307

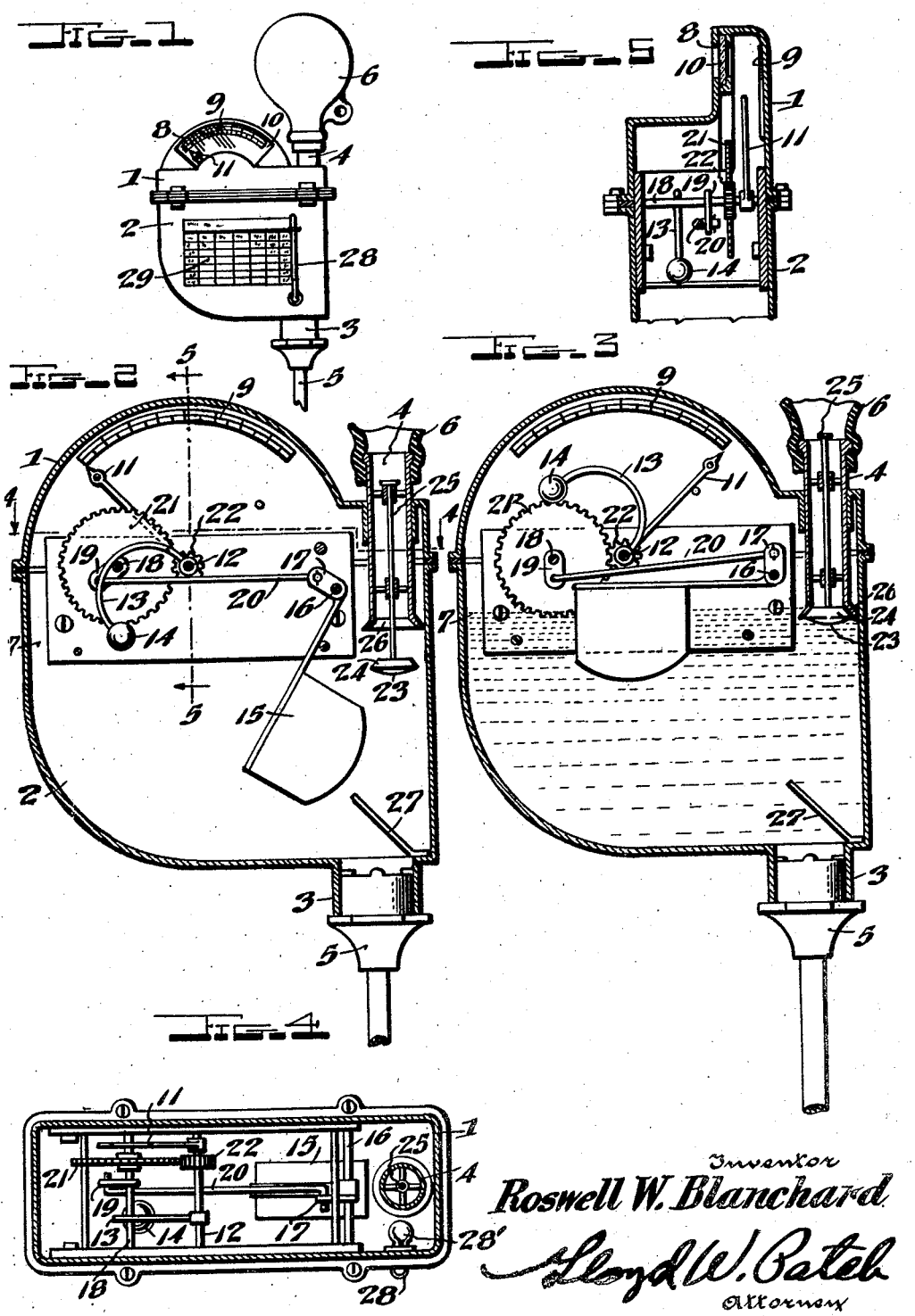

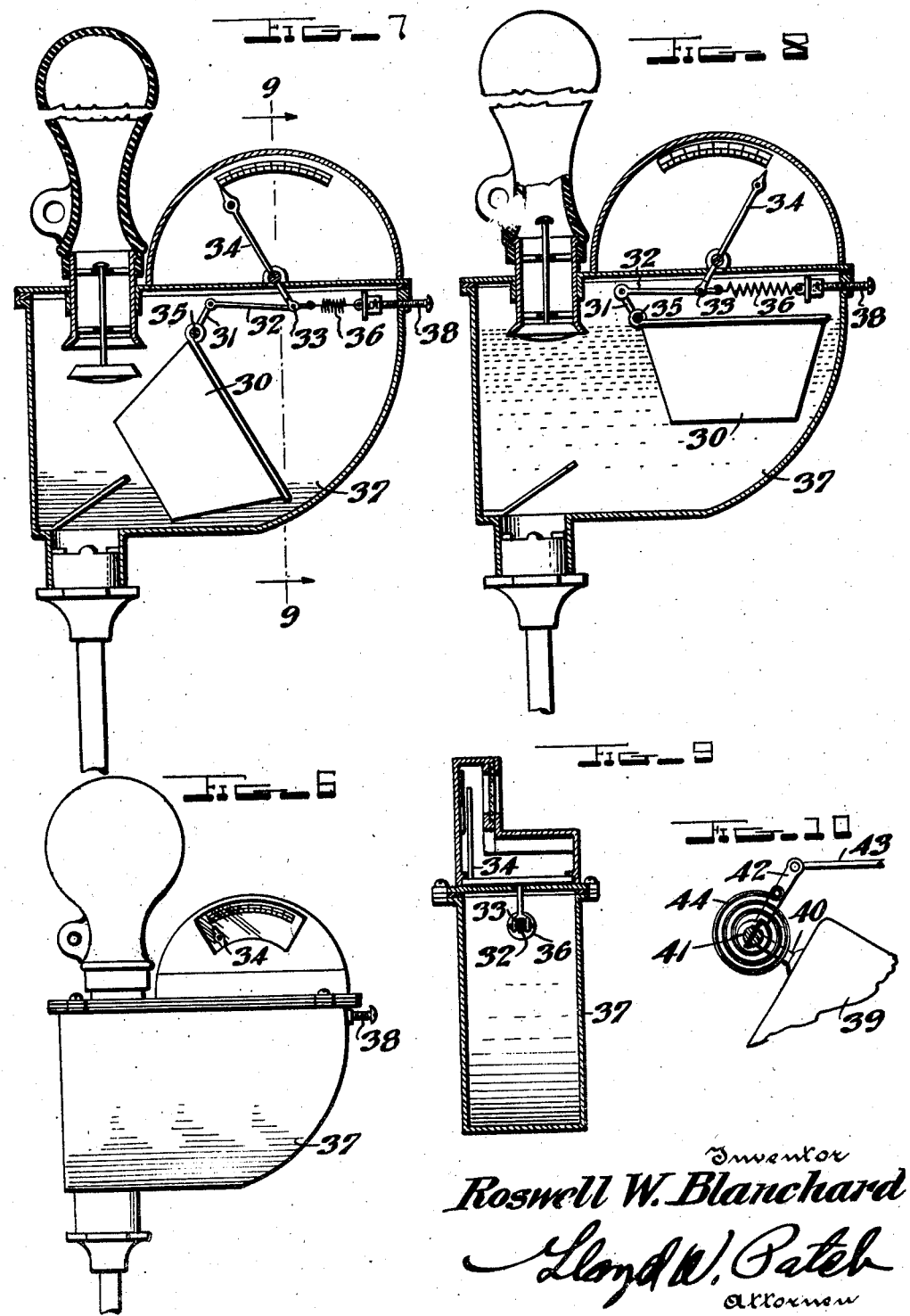

HYDROMETER

Roswell W. Blanchard, Fitchburg, Mass., assignor to E. Edelmann & Co., Chicago, Ill., a corporation of Illinois Application November 16, 1939, Serial No. 304,853

3 Claims. (Cl. 265—45)

My invention relates to improvements in hydrometers, and particularly to an instrument and device of this character intended and adapted for use in determining the specific gravity of a liquid, or other characteristics based upon the specific gravity, by testing a relatively small or limited test quantity of the liquid.

An object of my invention is to provide a hydrometer instrument that can be operated and used in substantially the usual manner, and with which the test quantity of liquid is tested at a predetermined level, thus permitting employment of test indicating means that will show accurately rather minute variations in specific gravity, and will permit display of such indications in "blown up" or enlarged showing.

Another purpose is to so construct the parts that the various portions of the instrument can be made of metal or of die cast rubber or of a synthetic resin or phenolic condensation product, or of other suitable plastic or molded material not readily affected by the liquid or solution being tested, and not readily and easily frangible or breakable, as with glass parts now ordinarily used.

Still another object is to provide an instrument of this character that can be set or adjusted to thus afford extreme accuracy, and with which provision may be made to compensate for variations in the temperature of the liquid or solution being tested.

Yet another object is to so construct the parts that the readings or indications are shown by a hand or arrow or pointer moving adjacent to a dial, and with which it is not necessary to use a float element having a gauge stem as now commonly employed in hydrometer instruments.

Still a further object is to provide an instrument of this character in which the readings are taken at a predetermined liquid level, together with means for drawing liquid into the instrument to the predetermined level, and means to stop or cut off the intake of liquid when this desired predetermined level has been attained.

With the above and other objects in view, some of which will be apparent to those skilled in the art, and others of which are inherent in the arrangement and use of the parts, my invention includes certain novel features of construction and association of elements that will be hereinafter set forth in connection with the drawings and then pointed out in the claims.

In the drawings:

Figure 1 is a view in side elevation showing a hydrometer embodying my invention.

Fig. 2 is a fragmentary vertical sectional view with the parts in the relation occupied when the instrument is out of use.

Fig. 3 is a view similar to Fig. 2 disclosing the parts in the testing position.

Fig. 4 is a transverse sectional view substantially on line 4—4 of Fig. 2.

Fig. 5 is a fragmentary vertical detail sectional view substantially on line 5—5 of Fig. 2.

Fig. 6 is a view in side elevation illustrating another embodiment of the invention.

Fig. 7 is a vertical sectional view through the instrument with the parts in inoperative relation.

Fig. 8 is a view similar to Fig. 7 disclosing the parts in indicating or testing position.

Fig. 9 is a vertical sectional view substantially on line 9—9 of Fig. 7.

Fig. 10 is a fragmentary sectional view showing still another modified construction.

As illustrated in Figs. 1 through 4, the body or container portion of the instrument is made in two parts, 1 and 2, which can be constructed of pressed or cast metal, or die cast rubber or synthetic resin or phenolic condensation product, or of other suitable and appropriate material. As illustrated, the part 1 serves as a housing and the part 2 as a liquid and float container.

The body portion is preferably made in two parts so that the parts can be more readily assembled therein, and the body portion has an intake sleeve or nipple 3 in the lower part thereof and a suction nipple or sleeve 4 in its upper part. An intake nozzle 5 can be connected at the intake sleeve 3 for convenient insertion in the opening of a battery or in the neck of a radiator, or in fact in any orifice or container with the liquid or solution to be tested. A suction bulb 6 is connected at the suction sleeve or nipple 4 and this bulb 6 can be employed to exhaust air from the testing chamber 7 within the body portion 2 so that the desired test quantity of liquid or solution will be drawn in through the intake nozzle 5.

The upper portion of the body has a viewing opening 8 therethrough and an indicating scale 9 is displayed within this opening 8, a glass or transparent cover portion 10 being preferably provided to close the opening 8 and yet permit a clear view of the indicating scale 9. An indicating pointer 11 is swingably mounted within the body portion through the medium of a shaft 12, and this indicating pointer is thus mounted for swingable movement around and adjacent to the indicating scale 9. As here shown, this shaft 12 has a curved arm 13 extending therefrom and provided at its end with a weight 14, and the arm and weight thus serve to exert a yielding pull at all times tending to move the indicator or pointer 11 to the minimum or low indicating position.

A float portion 15 is swingably mounted within the body portion 2 upon a shaft 16, and an arm 17 extends from the shaft 16 substantially radially to serve after the manner of a bell crank lever. A shaft 18 journalled substantially parallel with shafts 16 and 12 has thereon an arm 19 and a connecting rod 20 is swingably connected at its ends to the outer ends of arms 19 and 17 so that swinging movement of the float 15 will cause the shaft 18 to be given a partial rotation. A gear wheel 21 fixed on the shaft 18 meshes with pinion 22 fixed on shaft 12, and thus as the float 15 moves to swing arm 17 pull is exerted through connecting rod 20 upon arm 19 and thus shaft 18 is given a partial rotation. This movement of shaft 18 causes the gear 21 to be turned and through the pinion 22 the shaft 12 has a partial rotation imparted thereto to swing the indicating arrow or pointer 11 adjacent to the scale 9.

With the indicating means and the actuating float as above described, it is essential that readings be taken with the liquid within the body 2 always at a predetermined or fixed level, and to attain and govern this fixed level I provide a vertically movable float portion 23 at the suction sleeve or nipple 4. A valve portion 24 guided by stem 25 is adapted to close onto valve seat 26, as the level of liquid within the body rises to a sufficient height to move the float portion 23 upwardly, and thus as the desired liquid level is attained the float portion 23 will close the valve portion 24 upon the seat 26 and in consequence the suction action of the bulb 6 is stopped or cut off so that excess liquid will not be drawn into the body portion 2. If desired, a deflector or baffle 27 can be provided adjacent to the liquid intake to cut down or retard turbulence that might otherwise cause foaming or splashing the liquid, and thus when the valve 24 closes to cut off the suction drawing liquid into the body portion the liquid will be at the desired predetermined level and will be presented as a substantially quiet and non-foaming test quantity of liquid in which a reading can be taken by noting the position of the pointer arrow or hand 11 upon and adjacent to the indicating scale 9.

It will of course be appreciated that the specific gravity reading will vary due to variations in the temperature of the test quantity of liquid, and it may be found desirable to provide a thermometer, or other temperature responsive and indicating means, as illustrated at 28. This thermometer can be conveniently located with its indicating portion on the outside of the body portion 1 and with a bulb or other temperature responsive portion 28' within the body portion 2 in position to be immersed in the test quantity of liquid and thus responsive to the temperature of this test quantity of liquid or solution.

The scale at 9 can be marked off to give any desired notations or indications, and where temperature changes are to be taken into account it may be found desirable to designate the divisions of the indicating scale 9 by letters or figures, and to then locate a correction chart on the side of the body 2 adjacent to the indicating portion 28 of the thermometer, as shown at 29 in Figure 1. With the correction table or chart 29 thus positioned it is possible to mark or show the indicia thereon in such manner that readings can be taken transversely and horizontally across from the indicating portion of the thermometer 28 and can be checked by reading vertically and a final figure representing freezing temperature or any other data desired to be figured, can be determined by noting the particular indication within the vertical column as indicated by the arrow or pointer 11 upon the indicating scale 9. With this construction and arrangement it is possible to provide a direct reading indicating and correction chart in the same field of vision with the temperature responsive means and the specific gravity indicating means.

In the disclosure in Figs. 7 through 9, the body portion is substantially the same as above described, and the float 30 has an extending arm 31 directly coupled by connecting rod 32 with an extension arm 33 on the indicating arrow or pointer hand 34, and thus as the float 30 swings around its pivotal mounting at 35 the pointer arrow or indicating hand 34 will be directly and correspondingly swung. To increase or decrease the relative movement the extension arms 31 and 33 can be varied in the proportionate length. I have here shown a spring 36 connected at one end to normally exert resilient force tending to move the pointer arrow or indicating hand 34 in one direction and to resiliently oppose movement of this part 34 as the float 30 swings upwardly due to the rise of liquid in the hydrometer body 37. The opposite end of this spring 36 is connected with an adjusting screw 38, and by manipulation of this adjusting screw 38 it is possible to adjust and vary the pull exerted through spring 36.

As shown in Fig. 10, the float 39 is connected by an arm 40 to the shaft 41 so that the shaft is rocked as its float rises and falls, and arm 42 is swingably mounted on this shaft 41. A connecting rod 43 extends from the outer end of arm 42 to actuate a pointer or indicating arm or other indicating member or portion. A bi-metallic member 44, of volute or other suitable form, can be connected between the shaft 41 and the arm 42, and these parts are located at such elevation that they will be immersed in the liquid as drawn into the hydrometer housing, in consequence of which the arm 42 will be set at different angles with respect to arm 40 of the float 39, and thus corrections for variations in temperature of the test quantity of liquid may be automatically accomplished. Of course, other temperature influenced means may be embodied and employed to compensate for variations in the temperature of the test quantity of liquid.

While I have herein shown and described only certain specific embodiments of my invention and have suggested only certain possible modifications, it will be appreciated that many changes and variations can be made in the form, construction and arrangement of the parts, and in the manner of employing the same for use, without departing from the spirit and scope of my invention.

I claim:

1. A hydrometer comprising a casing body having a liquid container portion and provided with a viewing opening at one side above said portion, a liquid intake connection to said casing body opening into the liquid container portion, a float swingably mounted in the liquid container portion and responsive to a test quantity of liquid at a predetermined level, an indicating scale visible through the viewing opening, an indicating pointer swingably mounted and having an indicating end movable adjacent to the indicating scale, means normally exerting force to swing said indicating pointer to an inoperative position, a mechanical movement connection between the float and the indicating pointer for swinging said pointer over the indicating scale as the height of flotation of the float changes due to variations in the specific gravity of a test quantity of liquid at the predetermined level in the container portion of the body, a suction bulb connected with said casing body at the top thereof in communication with the liquid container portion, and valve means actuated by the test quantity of liquid upon attainment of the desired level of liquid in the container portion closing off said suction bulb.

2. A hydrometer comprising a casing body having a liquid container portion and provided with a viewing opening at one side above said portion, a liquid intake connection to said casing body opening into the liquid container portion, a float swingably mounted in the liquid container portion and responsive to a test quantity of liquid at a predetermined level, an indicating scale visible through the viewing opening, an indicating pointer swingably mounted and having an indicating end movable adjacent to the indicating scale, means normally exerting force to swing said indicating pointer to an inoperative position, a mechanical movement connection between the float and the indicating pointer for swinging said pointer over the indicating scale as the height of flotation of the float changes due to variations in the specific gravity of a test quantity of liquid at the predetermined level in the container portion of the body, a suction bulb connected with said casing body at the top thereof in communication with the liquid container portion, a suction tube in said suction bulb extending into the liquid container portion of the casing body substantially to the liquid level as desired for a test quantity of liquid, and a float valve carried by said suction tube actuated by the test quantity of liquid upon attainment of the desired liquid level closing the suction end of said tube.

3. A hydrometer comprising a closed casing body having a liquid container portion in the lower part thereof, an indicating casing portion on the upper part of said casing body at one side, a float swingably mounted in the liquid container portion, a rockable shaft, an indicator pointer carried by said rockable shaft with the indicating end visible within the indicating casing portion, indicating scale means within the indicating casing visible adjacent to said indicating end, a connection between the swingable float and the rockable shaft for transmitting motion to move the indicator adjacent to the indicating scale relatively corresponding to the height of flotation of the swingable float to thus indicate differences in specific gravity of a liquid solution being tested at a predetermined level within the liquid container portion, a suction tube in the upper part of said casing body having its inner end at the predetermined liquid level within the liquid container portion, a suction bulb connected with the outer end of said suction tube, and float actuated valve means carried by said suction tube operated by the test quantity of liquid within the liquid container portion closing the inner end of said suction tube upon attainment of the desired predetermined liquid level therein.

ROSWELL W. BLANCHARD.